United States Patent [19]
Royer et al.

[11] Patent Number: 5,710,791
[45] Date of Patent: Jan. 20, 1998

[54] METHODS AND APPARATUS FOR PREDICTING VOICE QUALITY IN AMPS CELLULAR RADIO SYSTEMS

[75] Inventors: Claude Royer, Hull, Canada; Charles P. Bernardin, Richardson; Wing F. Lo, Plano, both of Tex.

[73] Assignee: Northern Telecom Limited, Montreal, Canada

[21] Appl. No.: 502,264

[22] Filed: Jul. 13, 1995

Related U.S. Application Data

[63] Continuation-in-part of Ser. No. 329,922, Oct. 27, 1994.
[51] Int. Cl.[6] .................................................. H04B 3/46
[52] U.S. Cl. ........................ 375/224; 455/33.1; 455/67.1
[58] Field of Search ............................. 375/224, 227, 375/1; 395/2.35, 2.79; 455/33.3, 67.1, 56.1, 33.1; 379/60

[56] References Cited

U.S. PATENT DOCUMENTS

| | | |
|---|---|---|
| 5,067,171 | 11/1991 | Kawano . |
| 5,175,867 | 12/1992 | Wejke et al. . |
| 5,193,102 | 3/1993 | Meidan et al. . |

*Primary Examiner*—Wellington Chin
*Assistant Examiner*—Congvan Tran
*Attorney, Agent, or Firm*—Foley & Lardner

[57] ABSTRACT

In methods and apparatus for assessing voice quality in AMPS cellular radio systems, a signal-to-noise ratio is estimated for a SAT signal of an RF channel, and the voice quality of the RF channel is inferred from the SAT signal-to-noise ratio.

11 Claims, 5 Drawing Sheets

5,710,791

METHODS AND APPARATUS FOR PREDICTING VOICE QUALITY IN AMPS CELLULAR RADIO SYSTEMS

RELATED APPLICATIONS

This application is a Continuation In Part (CIP) of U.S. patent application Ser. No. 08/329,922 filed in the name of Claude Royer on Oct. 27, 1994.

FIELD OF INVENTION

This invention relates to methods and apparatus for predicting voice quality of Radio Frequency (RF) channels in Analog Mobile Phone Service (AMPS) cellular radio systems.

BACKGROUND OF INVENTION

AMPS cellular radio systems comprise a plurality of base stations connected to a switched telecommunications network and a plurality of mobile units. Mobile units are connected to the telecommunications network by establishing radio links with nearby base stations. As mobile units travel from an area served by a first base station to an area served by a second base station, the radio link between the mobile unit and the first base station must be replaced by a radio link between the mobile unit and the second base station to maintain communications between the mobile unit and the telecommunications network. This operation is generally called a "hand-off" of the mobile unit from the first base station to the second base station.

Hand-off operations are triggered when the base station currently linked to a mobile unit detects degradation of radio signals received from that mobile unit. Consequently, base stations must monitor the quality of signals received from mobile units. One useful measure of signal quality is the carrier-to-interference ratio of the received signals.

Each base station receives radio signals from all mobile units which are operating within its receiving range. As this receiving range overlaps with serving areas of neighboring base stations, the base stations must be able to distinguish signals received from those mobile units they are currently serving from signals received from mobile units served by neighboring base stations. To this end, each base station transmits an out-of-band Supervisory Audio Tone (SAT) to each of the mobile units it is currently serving, and each mobile unit retransmits the SAT for reception by the base stations. As adjacent base stations are assigned distinct SATs, each base station can recognize signals intended for its reception by the presence of its distinctive SAT in those signals.

SUMMARY OF INVENTION

An object of this invention is to provide methods and apparatus for assessing voice quality for RF channels at AMPS cellular radio base stations.

Another object of this invention is to provide methods and apparatus for estimating carrier-to-interference ratios for RF channels at AMPS cellular base stations. The resulting carrier-to-interference ratio estimates may form a suitable basis for deciding when to hand-off mobile units from one base station to an adjacent base station.

One aspect of the invention provides a method for assessing voice quality for an RF channel in an AMPS cellular radio system. The method comprises transmitting a SAT signal from a base station to a mobile unit served by that base station on the RF channel, receiving the SAT signal at the mobile unit, retransmitting the received SAT signal at the mobile unit on the RF channel, receiving the retransmitted SAT signal at the base station, and estimating a signal-to-noise ratio for the received SAT signal at the base station.

Hand-off may be triggered if the estimated signal-to-noise ratio is less than a predetermined threshold.

Another aspect of the invention provides a method for estimating a carrier-to-interference ratio of an RF channel in an AMPS cellular radio system. The method comprises transmitting a SAT signal from a base station to a mobile unit served by that base station on the RF channel, receiving the SAT signal at the mobile unit, retransmitting the received SAT signal at the mobile unit on the RF channel, receiving the retransmitted SAT signal at the base station, estimating a signal-to-noise ratio for the received SAT signal at the base station, and calculating a carrier-to-interference ratio for the RF channel from the estimated signal-to-noise ratio.

The step of estimating a signal-to-noise ratio for the received SAT signal may comprise filtering the received SAT signal to separate frequency components at each possible SAT frequency, and comparing the separated components to estimate the signal-to-noise ratio.

The step of calculating a carrier-to-interference ratio may comprise multiplying the estimated signal-to-noise ratio by a constant factor.

Another aspect of the invention provides apparatus for assessing voice quality of an RF channel in an AMPS cellular radio system. The apparatus comprises a receiver for receiving a signal on an RF channel, a filter network for filtering the received signal to separate frequency components at each possible SAT frequency, a power measurer for measuring powers of the separated signals, and a comparator for comparing the measured powers to estimate a signal-to-noise ratio.

The comparator and the channel allocator may be implemented in a processor and a memory containing instructions for execution by the processor to compare the separated components and to allocate the RF channel.

The filter network and the power measurer may be implemented as further instructions for execution by the processor to digitally filter the received signal.

BRIEF DESCRIPTION OF DRAWINGS

Embodiments of the invention are described below by way of example only. Reference is made to accompanying drawings in which.

DETAILED DESCRIPTION

Figure 1:
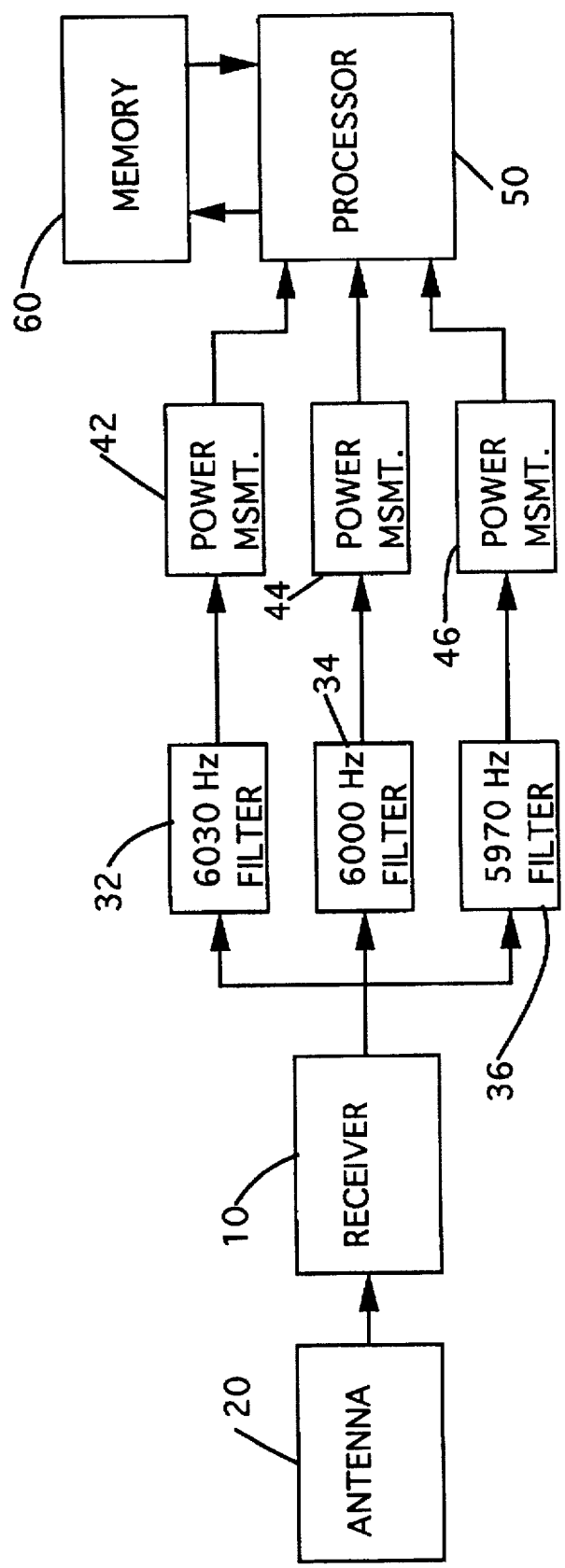
FIG. 1 is block schematic diagram of base station subsystems according to a first embodiment for receiving radio signals from mobile units and for estimating carrier-to-interference ratios of the received signals.

A cellular radio base station according to a first embodiment comprises subsystems as shown in FIG. 1 for receiving signals from mobile units and for estimating signal-to-noise ratios of SAT components of the received signals. These subsystems include a Frequency Modulation (FM) radio receiver 10 and an antenna 20 for coupling radio signals to the radio receiver 10. The subsystems further comprise three bandpass filters 32, 34, 36 for filtering the received signals, three power measurement circuits 42, 44, 46 for measuring power levels of the filtered signals, and a processor 50 and memory 60 for processing the measured power levels to estimate the carrier-to-interference ratios.

The FM radio receiver 10 receives and FM demodulates the radio signal. A low pass filter (not shown) separates a baseband audio component of the demodulated signal from higher frequency SAT components of the demodulated signal. Each of the bandpass filters 32, 34, 36 has a passband approximately 30 Hz wide centered at one of the three SAT frequencies (5970 Hz, 6000 Hz and 6030 Hz) used in AMPS cellular radio systems. Consequently, the bandpass filters 32, 34, 36 separate frequency components of the demodulated radio signal at the SAT frequencies and couple these frequency components to the respective power measurement circuits 42, 44, 46. The power measurement circuits 42, 44, 46 measure power levels of the SAT frequency components and convert the measured power levels to digital codes which are coupled to the processor 50 as inputs.

The processor 50 executes instructions stored in the memory 60 to compare the measured SAT frequency components, thereby estimating a signal-to-noise ratio for the SAT component of the received radio signal.

The signal-to-noise ratio of a narrow band FM modulated SAT signal having a modulation depth $\beta$ is given approximately by:

$$(SNR)_{SAT} = J_1(\beta)(CIR)_{RF}$$

where $J_1(\beta)$ denotes a first order Bessel function, and $(CIR)_{RF}$ denotes the carrier-to-interference ratio of the RF signal. In AMPS systems, the SAT signal is FM modulated with a modulation depth of $\beta=0.333$, so that:

$$(SNR)_{SAT} = 0.164(CIR)_{RF}$$

Subjective tests have shown that a (CIR)RF of 18 dB (63.1) is required for high quality voice channel performance. Consequently, the performance quality of a voice channel can be predicted from the estimated $(SNR)_{SAT}$. In particular, an $(SNR)_{SAT}$ of 10.15 dB corresponds to a (CIR) $_{RF}$ of 18 dB and should provide good voice channel performance. Moreover, the $(CIR)_{RF}$ can be calculated from the $(SNR)_{SAT}$ by multiplying by 6.1, or adding 7.85 dB.

The processor 50 also performs hand-off of calls at the base station. Instructions stored in the memory 60 cause the processor 50 to trigger hand-off if the calculated $(SNR)_{SAT}$ is less than 10.15 dB (10.35).

The processor 50 can also be programmed by means of suitable instructions stored in the memory 60 to calculate the $(CIR)_{RF}$ by multiplying the $(SNR)_{SAT}$ by 6.1 (or adding 7.85 dB). The processor 50 can then be programmed to trigger hand-off if the calculated $(CIR)_{RF}$ is less than 63.1 (or 18 dB).

Figure 2:
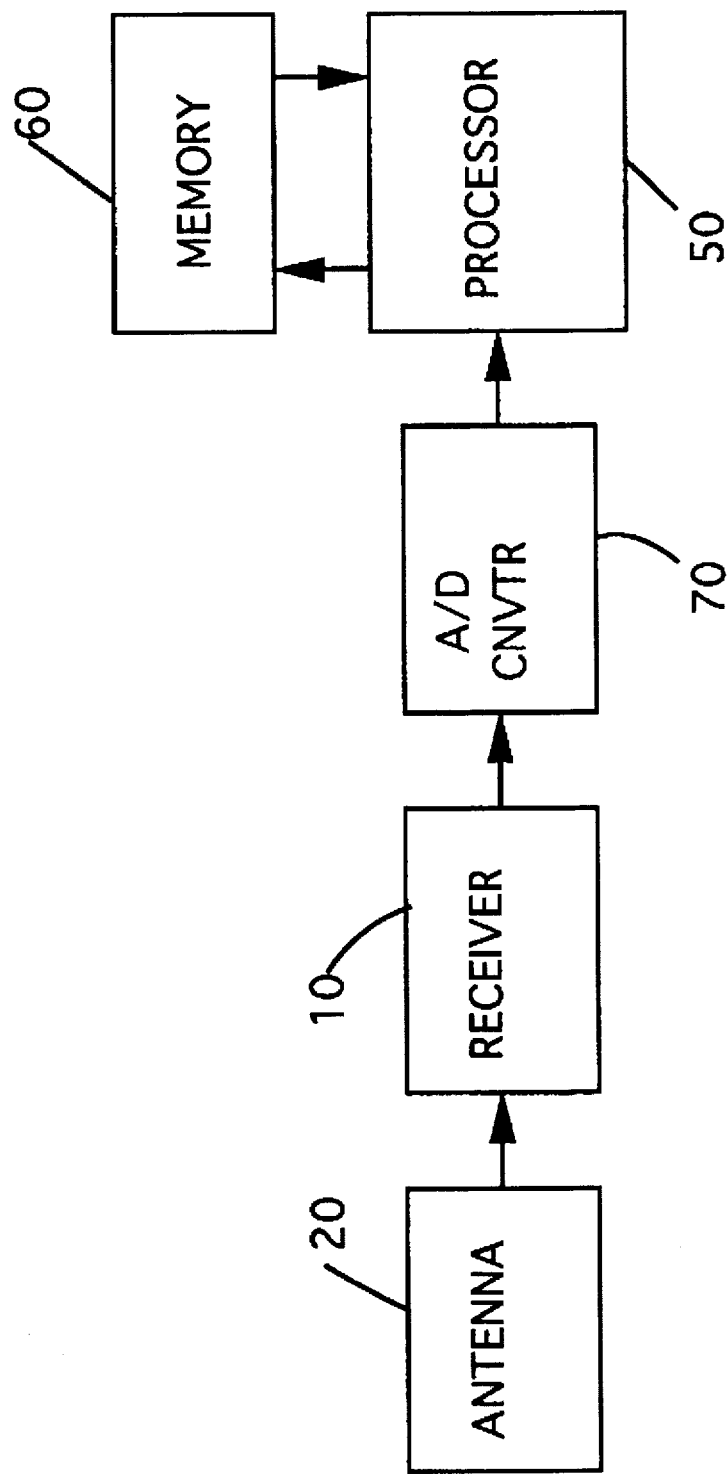
FIG. 2 is block schematic diagram of base station subsystems according to a second embodiment for receiving radio signals from mobile units and for estimating carrier-to-interference ratios of the received signals.

A cellular radio base station according to a second embodiment comprises subsystems as shown in FIG. 2 for receiving signals from mobile units and for estimating signal-to-noise ratios of the SAT components of the received signals. In the embodiment of FIG. 2, an analog-to-digital converter 70 digitizes the demodulated output of the receiver 10, and the processor 50 is programmed by means of instructions stored in the memory 60 to digitally filter the digitized signal to separate the SAT components of the demodulated signal. Further instructions in the memory 60, define an algorithm for computing the power levels of digitally filtered signals and for comparing the power levels to estimate the $(SNR)_{SAT}$.

As in the embodiment of FIG. 1, the processor 50 can also perform channel allocation during call initiation and hand-off of calls at the base station, allocating RF channels for use as voice channels if and only if the calculated $(SNR)_{SAT}$ exceeds 10.15 dB. The processor 50 can also be programmed to calculate the $(CIR)_{RF}$ from the $(SNR)_{SAT}$ by 6.1 (or adding 7.85 dB). The processor 50 can then be programmed to allocate RF channels if and only if the calculated $(CIR)_{RF}$ exceeds 18 dB.

Figure 3:
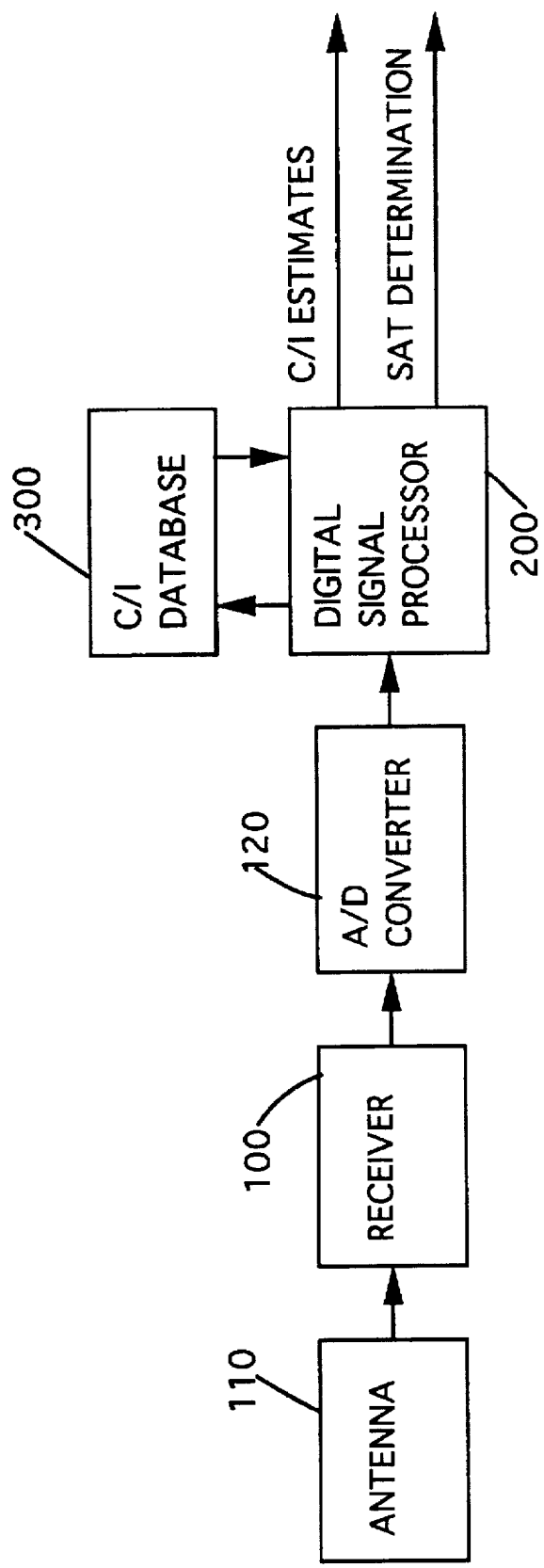
FIG. 3 is a block schematic diagram of base station subsystems according to a third embodiment for receiving radio signals from mobile units and for estimating carrier-to-interference ratios of the received signals.

A cellular radio base station according to a third embodiment comprises subsystems as shown in FIG. 3 for receiving signals from mobile units and for estimating carrier-to-interference ratios of the received signals. These subsystems include a radio receiver 100 and an antenna 110 for coupling radio signals to the receiver 100. The subsystems further comprise an analog-to-digital converter 120 for converting received analog radio signals to a sequence of digitally encoded samples r(n) having a sampling rate of 48,600 samples per second. The subsystems further comprise a digital signal processor 200 which operates in cooperation with a carrier-to-interference database 300 to estimate carrier-to-interference ratios of the received signals, and to determine which Supervisory Audio Tones (SATs) are carried in the received signals.

Figure 4:
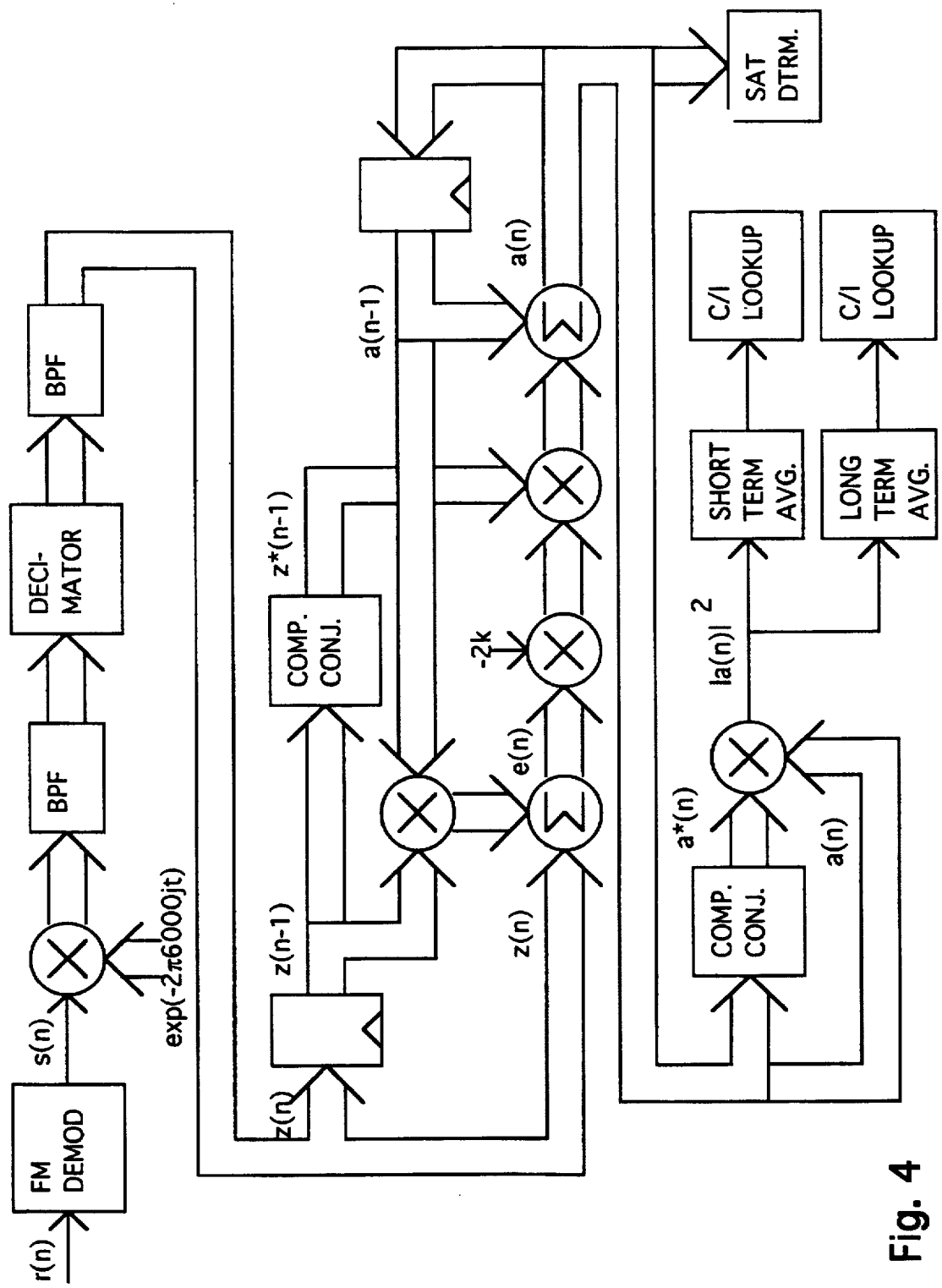
FIG. 4 is a block schematic diagram illustrating functions performed by a digital signal processing subsystem of FIG. 3 to estimate carrier-to-interference ratios.

FIG. 4 is a block schematic diagram illustrating functions performed by the digital signal processor 200 to estimate the carrier-to-interference ratios of the received signals. These functions are implemented in firmware or software which is stored in a memory of the digital signal processor 200 and which run on a microprocessor of the digital signal processor 200.

Figure 5:
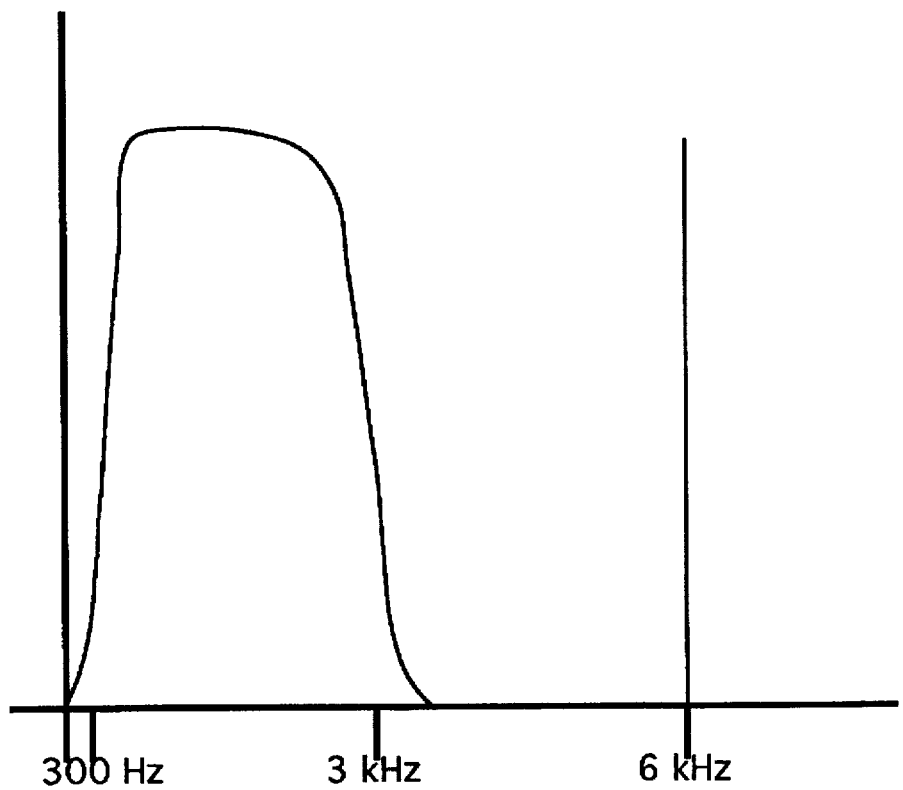
FIG. 5 is a plot illustrating a signal spectrum of radio signals after FM demodulation by the digital signal processing subsystem.

The digital signal processor 200 demodulates the received digital signal r(n) using conventional digital FM demodulation techniques to produce a real-valued sequence s(n) having a frequency spectrum essentially as illustrated in FIG. 5. In particular, the demodulated digital signal s(n) has a voice band component between approximately 300 Hz and 3 kHz and a SAT component within a 100 Hz band centered at approximately 6 kHz.

The digital signal processor 200 multiplies the real-valued sample sequence s(n) by exp(−j2p6000t) to derive a complex-valued sample sequence having a SAT component at approximately −30 Hz, 0 Hz or +30 Hz, bandpass filters the complex-valued sample sequence to reject spectral components outside a −50 Hz to +50 Hz band containing the SAT component, decimates the resulting complex-valued sample sequence to reduce the sample rate to 120 samples per second, and bandpass filters the resulting complex-valued sample sequence to compensate for roll-off at edges of the −50 Hz to +50 Hz passband of the previous bandpass filtering operation.

The digital signal processor 200 uses the resulting complex-valued sample sequence z(n) to compute a sequence a(n) of complex-valued first order autoregressive parameters given by:

$$a(n)=a(n-1)-2k\,e(n)z^*(n-1)$$

where e(n) is a sequence of complex-valued filter residuals given by:

$$e(n)=z(n)+a(n-1)z(n-1)$$

and k is a real-valued constant equal to the iteration step size.

The initial value a(1) in the sequence a(n) of complex-valued first order autoregressive parameters for each sequence r(n) of received signal samples is set according to the SAT frequency of the base station as follows:

| SAT Frequency | a (1) |
|---|---|
| 5970 Hz | −j |
| 6000 Hz | 1 |
| 6030 Hz | +j |

Figure 6:
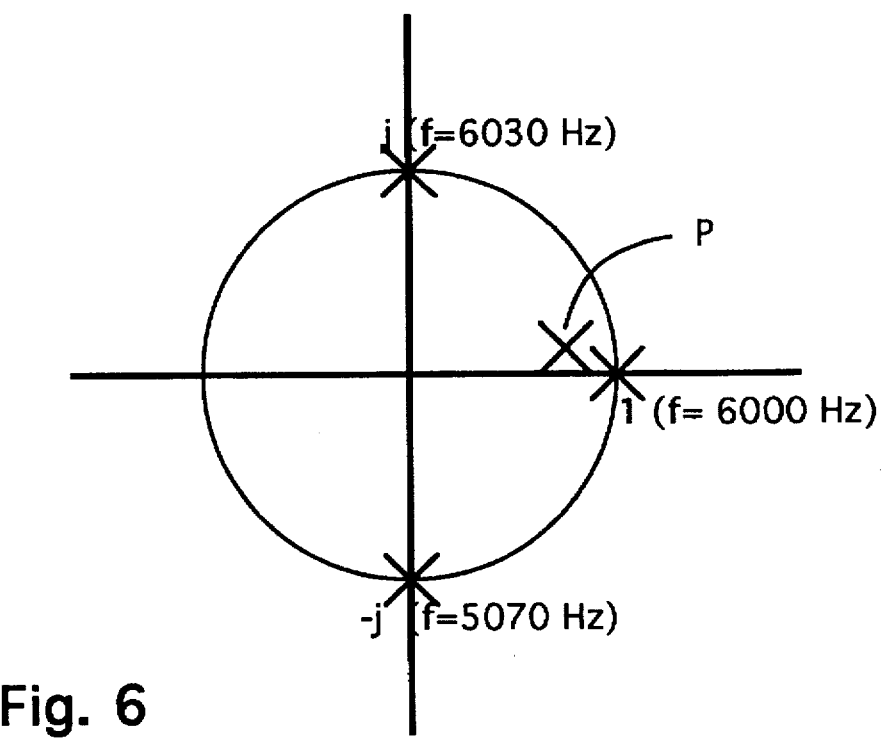
FIG. 6 is a plot on the complex plane illustrating the values of carrier-to-interference indices calculated by the digital signal processing subsystem for different carrier-to-interference ratios and SAT frequencies.

It can be shown that for an ideal system in which the received signal has a SAT component exactly equal to one of the nominal SAT frequencies and in which there is no interference in the SAT band, the sequence a(n) of first order autoregressive parameters will converge to a complex-value located in the complex plane at an intersection of a unit circle and an axis of the complex plane, as shown in FIG. 6. Deviations of the SAT component from the nominal SAT frequency will cause the sequence a(n) of first order autoregressive parameters to converge to a value which is displaced from the axis of the complex plane along the unit circle. Interference in the SAT band will cause the sequence a(n) of first order autoregressive parameters to converge to a value which is displaced from the unit circle along the axis of the complex plane toward the origin. In real systems, the combined effect of deviations of the SAT component from nominal SAT frequencies and interference cause the sequence a(n) of first order autoregressive parameters to converge to a value which is displaced both from the axes of the complex plane and from the unit circle. For example, a SAT component at approximately 6005 Hz having a carrier-to-interference ratio of approximately 12 dB may have a first order autoregressive parameter located in the complex plane as shown at P in FIG. 6.

The digital signal processor 200 computes the squared magnitude $|a(n)|^2$ of the first order autoregressive parameter a(n), and averages the squared magnitude $|a(n)|^2$ over both a short time interval and a long time interval to derive real-valued short term and long term carrier-to-interference indices. (Both interval lengths are adjustable. The short interval length is typically set to approximately 2 seconds and the long interval length is typically set to 10 seconds.)

The carrier-to-interference database 300 includes files containing carrier-to-interference ratio estimates and corresponding carrier-to-interference indices. The correspondence between the carrier-to-interference indices and the carrier-to-interference ratio estimates was established during development of the carrier-to-interference database 300 by applying the processing described above to input signals having known carrier to interference ratios to determine the squared magnitude $|a|^2$ of the resulting first order autoregressive parameter. The carrier-to-interference ratio of the input signals was incremented through approximately 30 steps of approximately 0.5 dB to generate corresponding carrier-to-interference index values characterizing an approximately 15 dB range of carrier-to-interference ratios considered to be the range of carrier-to-interference ratios which is relevant to making hand-off decisions. A curve was fit to the 30 measured data points, and the curve was used to estimate carrier-to-interference index values corresponding to 256 carrier-to-interference ratios having a spacing of approximately 0.06 dB. The 256 carrier-to-interference ratios and corresponding carrier-to-interference indices were stored in the carrier-to-interference database.

After calculating the short term and long term carrier-to-interference indices for a signal received by the base station, the digital signal processor 200 searches the carrier-to-interference database 300 to determine which stored carrier-to-interference index is closest to the calculated short term carrier-to-interference index, and outputs as a short term carrier-to-interference estimate the carrier-to-interference estimate corresponding to that carrier-to-interference index. Similarly, the digital signal processor 200 searches the carrier-to-interference database 300 to determine which stored carrier-to-interference index is closest to the calculated long term carrier-to-interference index, and outputs as a long term carrier-to-interference estimate the carrier-to-interference estimate corresponding to that carrier-to-interference index. The short term and long term carrier-to-interference ratio estimates are used by handoff control functional blocks (not shown) to determine whether a hand-off should be requested.

The digital signal processor 200 also determines the most probable SAT frequency for the received signal by comparing the real and imaginary parts of the first order autoregressive parameters a(n).

The embodiments described above may be modified without departing from the principles of the invention, the scope of which is defined by the claims below.

We claim:

1. A method for assessing voice quality for an RF channel in an AMPS cellular radio system, the method comprising:

transmitting a SAT signal from a base station to a mobile unit served by that base station on the RF channel;

receiving the SAT signal at the mobile unit;

retransmitting the received SAT signal at the mobile unit on the RF channel;

receiving the retransmitted SAT signal at the base station;

filtering the received SAT signal to separate frequency components at each possible SAT frequency; and comparing the separated components to estimate a signal-to-noise ratio for the received SAT signal at the base station.

2. A method as defined in claim 1, further comprising triggering hand-off if the estimated signal-to-noise ratio is less than a predetermined threshold.

3. A method as defined in claim 2, wherein the predetermined threshold is 10.35.

4. A method as defined in claim 2, wherein the predetermined threshold is 10.15 dB.

5. A method for estimating a carrier-to-interference ratio of an RF channel in an AMPS cellular radio system, the method comprising:

transmitting a SAT signal from a base station to a mobile unit served by that base station on the RF channel;

receiving the SAT signal at the mobile unit;

retransmitting the received SAT signal at the mobile unit to the base station on the RF channel;

receiving the retransmitted SAT signal at the base station;

estimating a signal-to-noise ratio for the retransmitted SAT signal received at the base station; and calculating a carrier-to-interference ratio for the RF channel from the estimated signal-to-noise ratio.

6. A method for estimating a carrier-to-interference ratio of an RF channel in an AMPS cellular radio system, the method comprising:

transmitting a SAT signal from a base station to a mobile unit served by that base station on the RF channel;

receiving the SAT signal at the mobile unit;

retransmitting the received SAT signal at the mobile unit to the base station on the RF channel;

receiving the retransmitted SAT signal at the base station;

filtering the retransmitted SAT signal received at the base station to separate frequency components at each possible SAT frequency; and comparing the separated components to estimate the signal-to-noise ratio for the retransmitted SAT signal received at the base station; and calculating a carrier-to-interference ratio for the RF channel from the estimated signal-to-noise ratio.

7. A method as defined in claim 6, wherein the step of calculating a carrier-to-interference ratio comprises multiplying the estimated signal-to-noise ratio by a constant factor.

8. A method as defined in claim 7, wherein the constant factor is 6.1.

9. Apparatus for assessing voice quality of an RF channel in an AMPS cellular radio system, the apparatus comprising:

a receiver for receiving a signal on an RF channel;

a filter network for filtering the received signal to separate frequency components at each possible SAT frequency;

a power measurer for measuring powers of the separated frequency components; and a comparator for comparing the measured powers to estimate a signal-to-noise ratio.

10. Apparatus as defined in claim 9, wherein the comparator and channel allocator are implemented in a processor and a memory containing instructions for execution by the processor to compare the separated components and to allocate the RF channel.

11. Apparatus as defined in claim 10, wherein the filter network and power measurer are also implemented in the processor and the memory, the memory containing further instructions for execution by the processor to digitally filter the received signal.

* * * * *